(12) United States Patent
Yamarthi et al.

(10) Patent No.: US 10,479,483 B2
(45) Date of Patent: Nov. 19, 2019

(54) PITCH CONTROL ASSEMBLY AND PROPELLER ASSEMBLY AND METHOD OF ADJUSTING PITCH

(71) Applicant: GE AVIATION SYSTEMS LLC, Grand Rapids, MI (US)

(72) Inventors: David Raju Yamarthi, Karnataka (IN); Rajendra Vishwanath Pawar, Karnataka (IN); Amit Arvind Kurvinkop, Karnataka (IN); Sandeep Kumar, Karnataka (IN); Murugesan Periasamy, Karnataka (IN); Ravindra Shankar Ganiger, Karnataka (IN); Bajarang Agrawal, Karnataka (IN); Nagashiresha G., Karnataka (IN)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 651 days.

(21) Appl. No.: 15/196,145

(22) Filed: Jun. 29, 2016

(65) Prior Publication Data
US 2017/0008612 A1    Jan. 12, 2017

(30) Foreign Application Priority Data
Jul. 8, 2015 (IN) ............................ 3498/CHE/2015

(51) Int. Cl.
*B64C 11/38* (2006.01)
(52) U.S. Cl.
CPC .................................. *B64C 11/38* (2013.01)
(58) Field of Classification Search
CPC ....... B64C 11/30; B64C 11/38; B64C 11/385; B64C 11/40; B64C 11/42; B64C 11/44
See application file for complete search history.

(56) References Cited

U.S. PATENT DOCUMENTS

| 1,450,159 | A | 3/1923 | Thomas |
| 3,487,880 | A | 1/1970 | Duncan et al. |
| 4,297,080 | A | 10/1981 | Krauss et al. |

(Continued)

FOREIGN PATENT DOCUMENTS

| EP | 2332829 A2 | 6/2011 |
| JP | 2014-530146 A | 11/2014 |

OTHER PUBLICATIONS

Notification of Reasons for Refusal issued in connection with corresponding JP Application No. 2016-125048 dated Jun. 27, 2017.

(Continued)

*Primary Examiner* — Woody A Lee, Jr.
*Assistant Examiner* — Christopher R Legendre
(74) *Attorney, Agent, or Firm* — McGarry Bair PC

(57) ABSTRACT

Pitch control assembly and propeller blade assembly having a spider hub are disclosed. The spider hub includes a hub and a set of arms spaced circumferentially about the hub and projecting radially from the hub, wherein the set of arms are configured to receive a set of blades such that a blade root of a blade is rotationally mountable into an arm included in the set of arms, a crosshead located within the hub and axially moveable relative to the hub, a torque tube located in the arm and extending into the hub, wherein a pitch angle of the blade can be adjusted by axially moving the crosshead to rotate the torque tube to effect a corresponding rotation of the blade.

13 Claims, 6 Drawing Sheets

(56) References Cited

U.S. PATENT DOCUMENTS

| | | | |
|---|---|---|---|
| 4,340,335 A | | 7/1982 | Cheney |
| 4,591,313 A * | | 5/1986 | Miyatake .............. B64C 11/306 |
| | | | 416/127 |
| 4,753,572 A * | | 6/1988 | Kusiak .................... B64C 11/30 |
| | | | 416/153 |
| 4,904,157 A | | 2/1990 | Pace et al. |
| 5,141,399 A * | | 8/1992 | Duchesneau ........... B64C 11/38 |
| | | | 416/157 R |
| 8,529,205 B2 * | | 9/2013 | Perkinson .............. B64C 11/38 |
| | | | 416/1 |
| 9,849,970 B2 * | | 12/2017 | Escure .................. B64C 11/385 |
| 2011/0286845 A1 | | 11/2011 | Perkinson |
| 2014/0369836 A1 | | 12/2014 | Clark et al. |
| 2017/0008612 A1 * | | 1/2017 | Yamarthi ................ B64C 11/38 |

OTHER PUBLICATIONS

Great Brittan search report issued in connection with corresponding GB Application No. GB1611757.4 dated Dec. 19, 2016.
French Preliminary Search Report, issued in related French Patent Application No. 1656405, 5 pages, Oct. 4, 2018.

* cited by examiner

PITCH CONTROL ASSEMBLY AND PROPELLER ASSEMBLY AND METHOD OF ADJUSTING PITCH

BACKGROUND

Propeller assemblies typically include multiple blades mounted to a hub, which is rotated by the engine. The hub typically defines a housing that retains a blade root of a propeller blade along with a variety of other mechanisms, including a pitch control unit.

When a pitch control unit (PCU) is used, the blade root is rotatably retained within the housing for rotation about a span-wise axis of the blade and the PCU rotates the blade about the span-wise axis to optimize efficiency of thrust delivery. In this manner, the propeller can be designed to vary pitch in flight, to give optimum thrust, from takeoff and climb to cruise. Varying the pitch angle can allow the aircraft to maintain an optimal angle of attack, or maximum lift to drag ratio, on the propeller blades as aircraft speed varies.

BRIEF DESCRIPTION

In one aspect, an embodiment relates to a propeller assembly including a spider hub including a hub and a set of arms spaced circumferentially about the hub and projecting radially from the hub, wherein the set of arms are configured to receive a set of blades such that a blade root of a blade is rotationally mountable into an arm included in the set of arms, a crosshead located within the hub and axially moveable relative to the hub, a torque tube located in the arm and extending into the hub, and having opposing first and second ends, with the first end configured to mount to the blade root, and a motion converter coupling the crosshead to the torque tube and converting axial movement of the crosshead into rotational movement of the torque tube, wherein a pitch angle of the blade can be adjusted by axially moving the crosshead to rotate the torque tube to effect a corresponding rotation of the blade.

In another aspect, an embodiment relates to a pitch control assembly for a propeller including a spider hub having a hub with a set of arms, and a set of propeller blades rotatably mounted to the set of arms, including a crosshead configured for axial movement relative to the hub, a torque tube having opposing first and second ends, with the first end configured to mount to the propeller blade, and a motion converter coupling the crosshead to the torque tube and converting the axial movement of the crosshead into rotational movement of the torque tube wherein a pitch angle of the propeller blades is adjusted by axially moving the crosshead to rotate the torque tube to effect a corresponding rotation of the propeller blade.

In yet another aspect, an embodiment relates to a method of adjusting the pitch of a propeller blade in a spider hub assembly having a hub with a set of arms, and a set of propeller blades rotatably mounted to the set of arms, the method including axially moving a crosshead within the hub to generate a torque and transferring the torque to the propeller blade using a torque tube.

DETAILED DESCRIPTION

Figure 1:
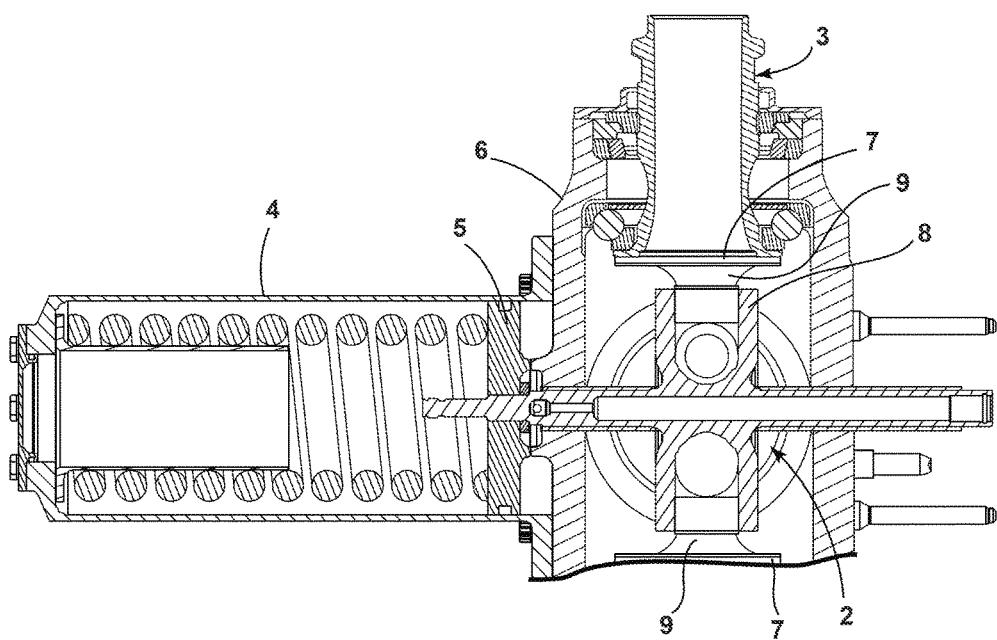
FIG. 1 illustrates an example cross-sectional view of a prior art propeller assembly and PCU.

As illustrated in FIG. 1, in a conventional PCU 2, the pitch of the propeller blades 3 is changed by varying the oil pressure to a hydraulic cylinder 4 and piston 5 projecting forwardly from the propeller hub 6 and connected to roots 7 of the propeller blades 3. In traditional hub designs, such as the propeller hub 6 shown, roots 7 of the propeller blades 3 extend close to a crosshead 8 and each propeller blade 3 gets pitched using an offset pin 9 in the propeller blade 3. More specifically, the offset pin 9 is retained within a portion of the crosshead 8. During operation, axial movement of the piston 5 is converted to rotational movement through cooperation of the crosshead 8 and the offset pin 9. More specifically, the axial translation of the crosshead 8 moves the offset pin 9 in the propeller blade 3 to effect a rotation of the blade and change the pitch angle of the propeller blade 3.

Conventional pitch change mechanisms such as the crosshead and offset pin described above in FIG. 1 cannot be used in spider hubs, because the pin of the propeller blade cannot reach to the crosshead and cannot provide sufficient offset for the pitch change. More specifically, the spider arm has a much longer radial height, which extends from a portion of the hub housing the crosshead to a radial end, where the propeller blade can be attached. This results in the blade root being radially away from the crosshead such that typical offset pins cannot be used because the radial gap between the root of the propeller blade and the crosshead would be too great for the pin to span and function. Embodiments relate to a propeller assembly and pitch control assembly for a propeller assembly having a spider hub and pitch control assembly, which results in reduced complexity and a low cost and low weight solution.

Figure 2:
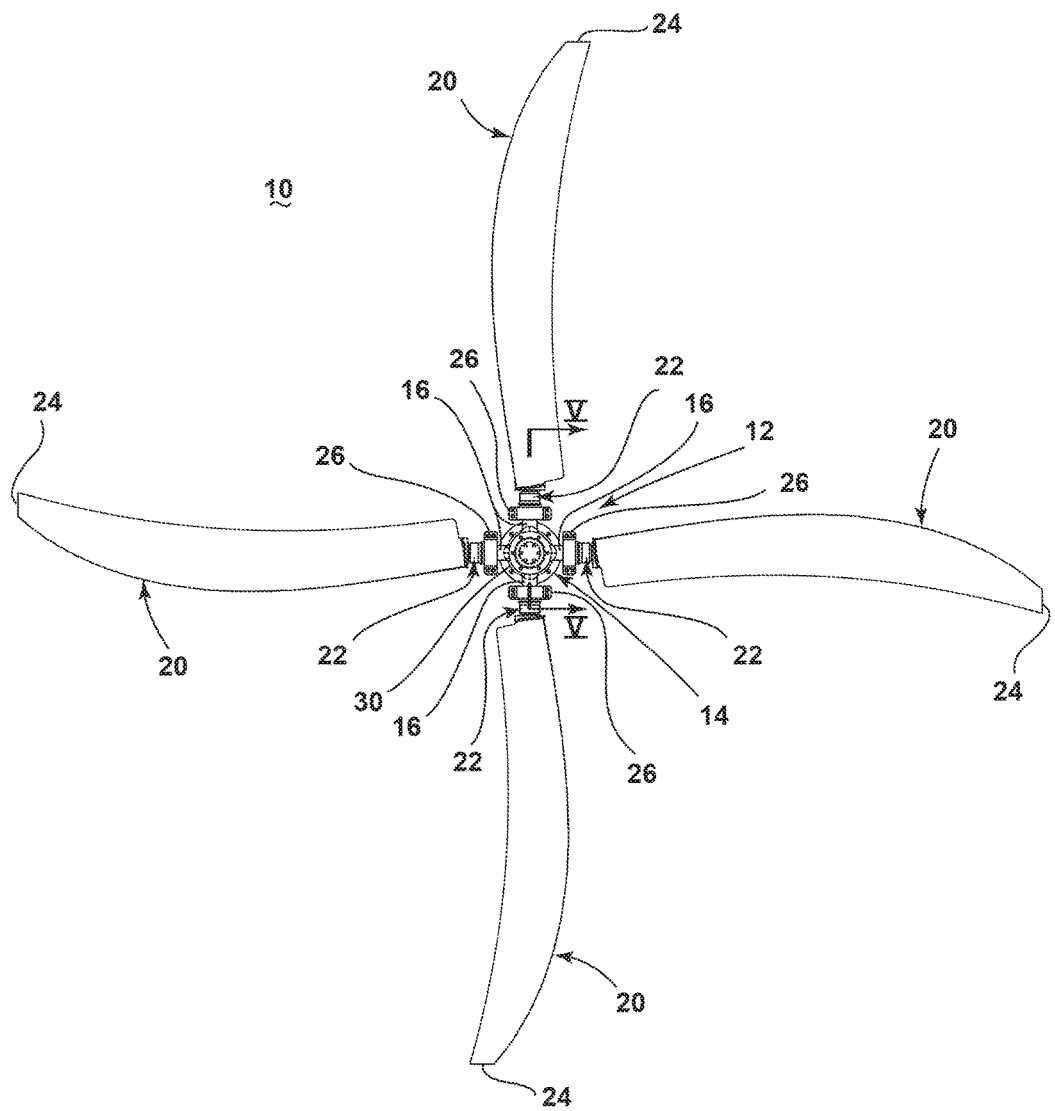
FIG. 2 illustrates an example front view of a propeller assembly having a pitch control assembly in accordance with various aspects described herein.
Figure 3:
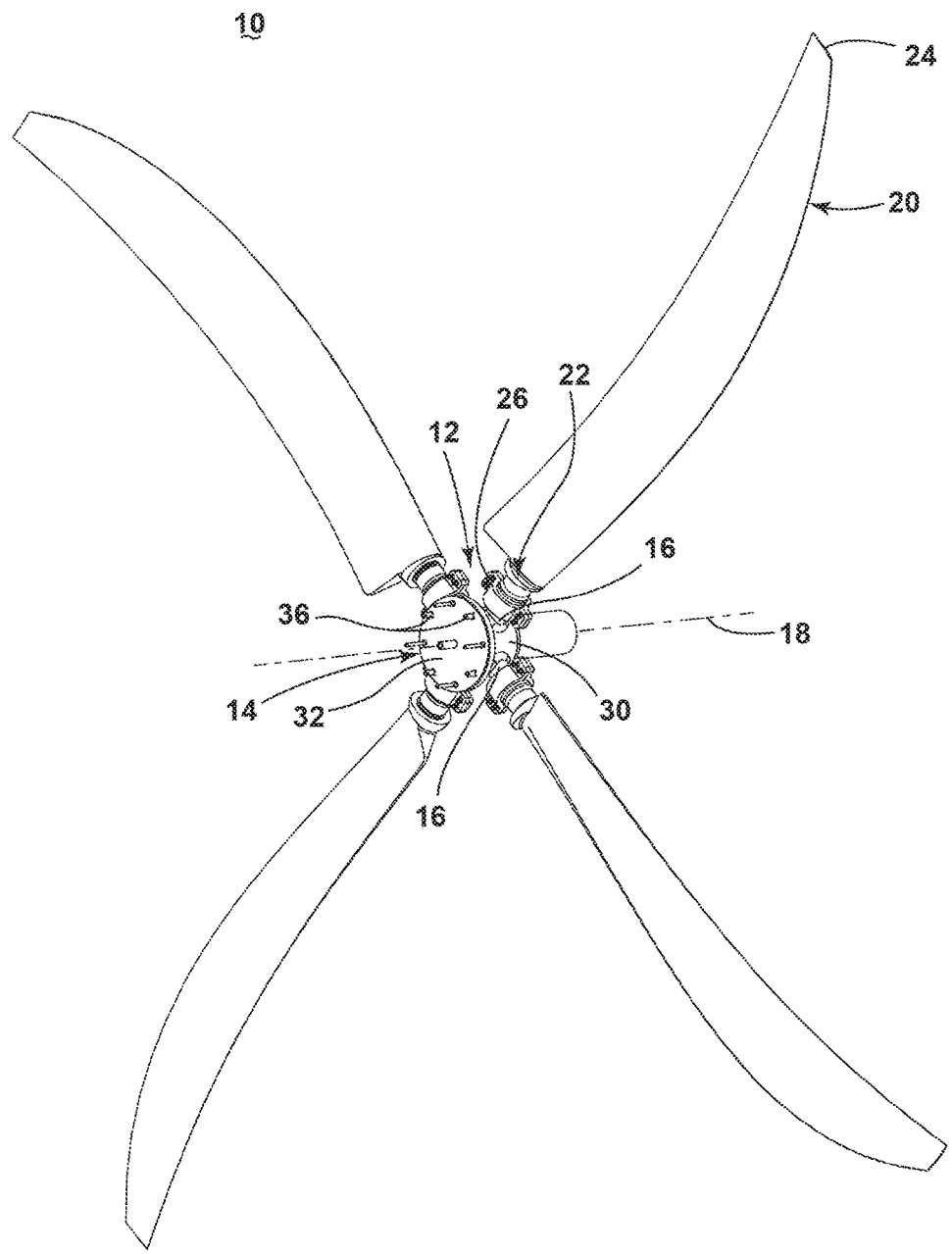
FIG. 3 illustrates an example perspective view of the propeller assembly in accordance with various aspects described herein.

FIG. 2 illustrates a propeller assembly 10 including a spider hub assembly 12 having a hub 14 and a set of arms 16. The hub 14 can be operably coupled to an engine (not shown) and can rotate about a propeller axis 18 (FIG. 3). As illustrated, the set of arms 16 is spaced circumferentially about the hub 14 and the set of arms 16 projects radially from the hub 14. It will be understood that "a set" as used herein can include any number including only one.

A set of propeller blades 20 is included in the propeller assembly 10. The propeller blades 20 can include corresponding blade roots 22 and opposing tips 24. Typically a propeller blade 20 is formed in a twisted airfoil shape, and can be composed of any suitable material including, but not limited to, metal or composite materials. The propeller blade 20 can be line-removable to provide cost and maintenance advantages. The term line-removable indicates that the propeller blade 20 can be removed and replaced in the field. Line-removable propeller blades 20 can be mounted to the spider hub assembly 12 and must be retained while allowing relative rotatable motion. While one example of an aircraft propeller assembly has been illustrated, it will be understood that any suitable structure or craft, to which a propeller, turbine, or fan having one or more blades is fitted, can utilize embodiments described herein.

The hub 14 provides a means to secure the set of propeller blades 20 and the spider hub assembly 12 can secure any number of propeller blades 20. More specifically, the blade root 22 of a propeller blade 20 can be rotationally mounted to a corresponding arm 16 of the spider hub assembly 12. In the illustrated example, a clamp 26 is utilized to mount the blade root 22 to its corresponding arm 16 and allow relative rotatable motion between the arm 16 and the blade root 22.

Figure 4:
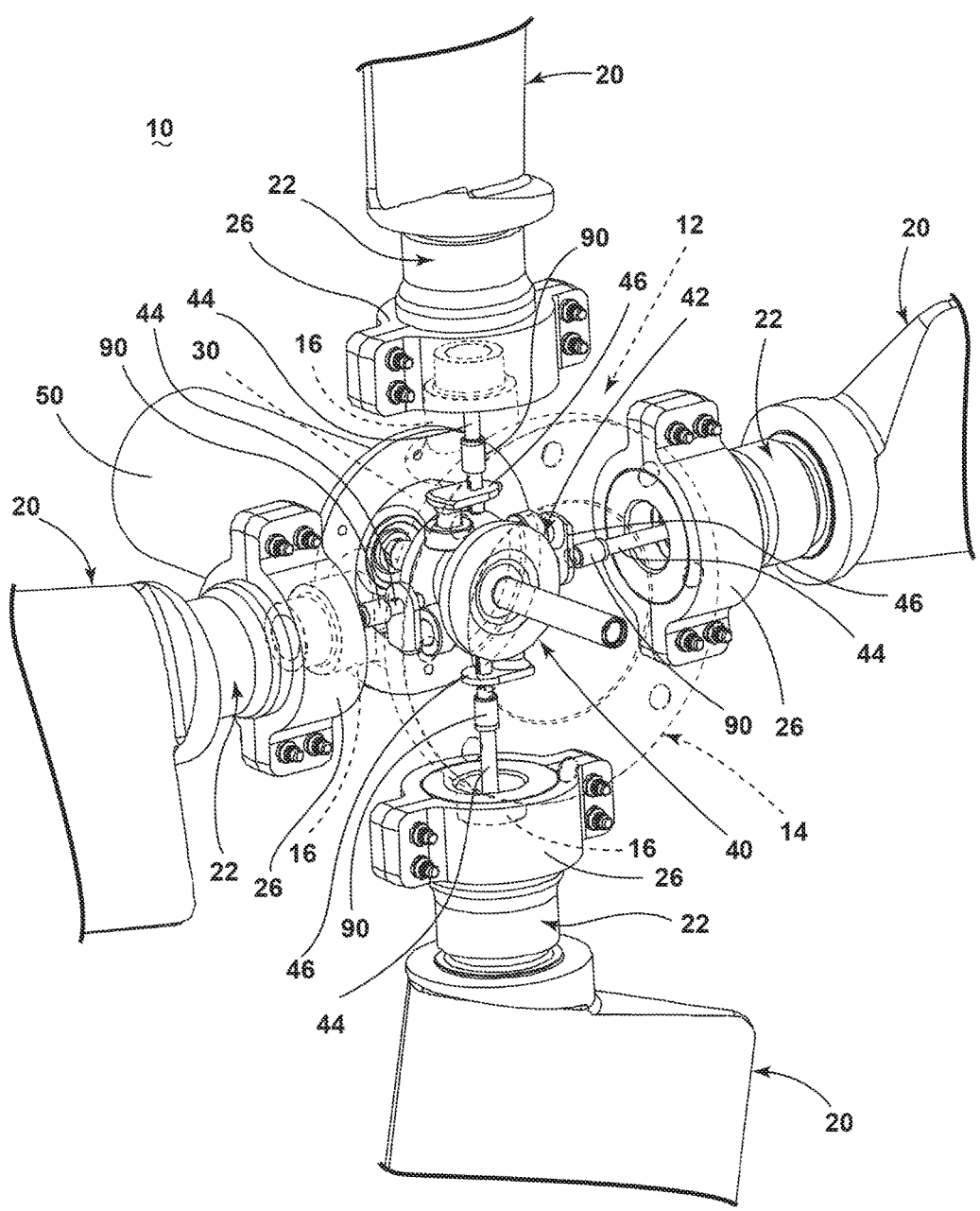
FIG. 4 illustrates an example perspective view of a portion of the propeller assembly in accordance with various aspects described herein.

FIG. 3 is a perspective view of the propeller assembly 10 and more clearly illustrates that the hub 14 includes a main body portion 30 and a backing plate 32. The main body portion 30 can define a recess 34 (FIG. 5), which can house portions of a pitch control assembly 40 (FIG. 4). The backing plate 32 can be mounted to the main body portion 30 in any suitable manner including via fasteners 36. The backing plate 32 provides a mounting surface for mounting the spider hub assembly 12 to an engine and acts as a structural member that transfers torque from the engine to the hub 14. The backing plate 32 can include any features suitable for coupling the spider hub assembly 12 to the engine.

FIG. 4 illustrates a portion of the propeller assembly 10 with the spider hub assembly 12 illustrated in phantom to more clearly illustrate the pitch control assembly 40 and its relationship with the set of propeller blades 20. A crosshead 42, a set of torque tubes 44, and a set of motion converters 46 are included in the pitch control assembly 40 and located within the hub 14. A hydraulic cylinder 50 projects axially or forwardly from the main body portion 30 and slidably supports a piston 52 (FIG. 5) that is operably coupled to the crosshead 42 of the pitch control assembly 40.

Figure 5:
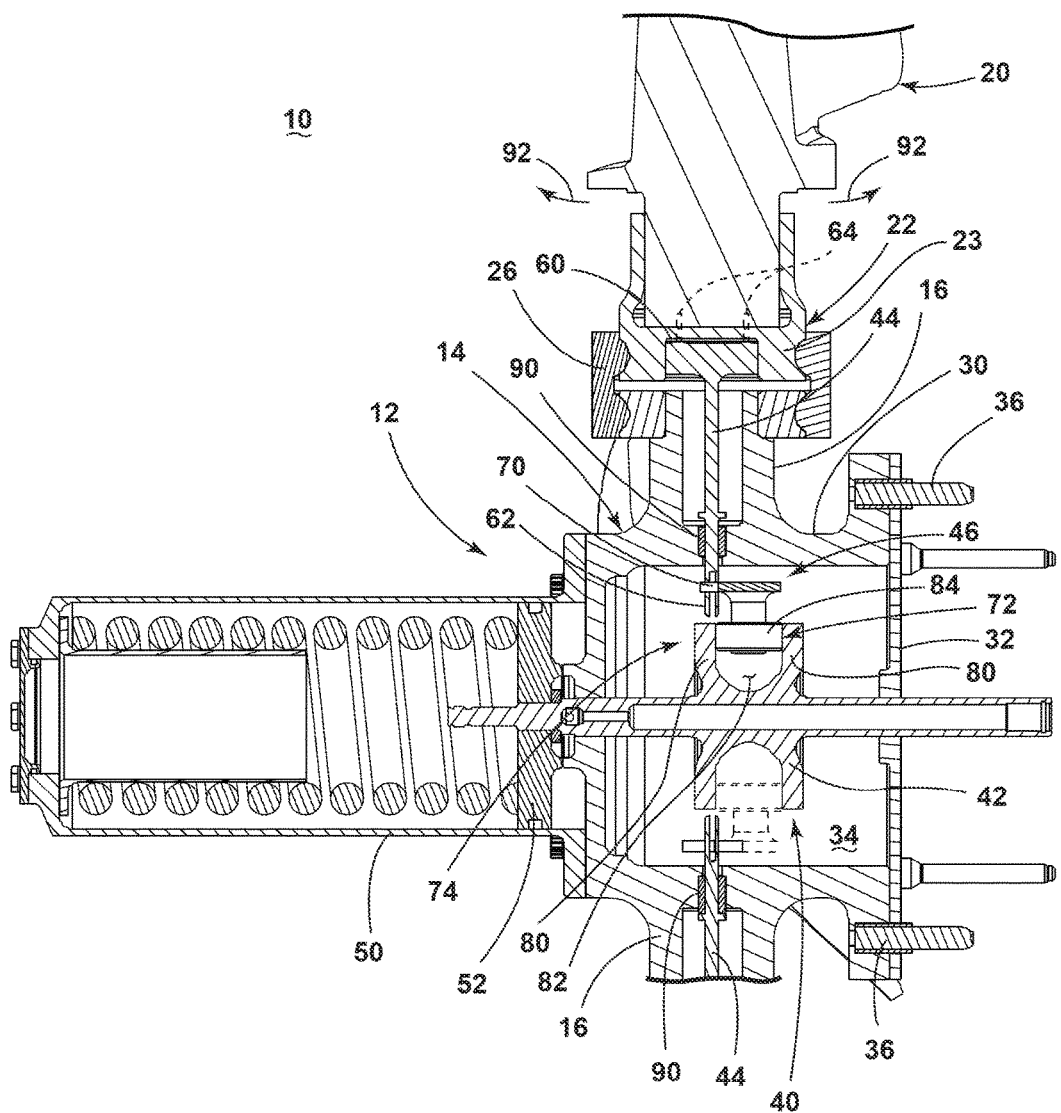
FIG. 5 illustrates an example cross-sectional view of a portion of the propeller assembly in accordance with various aspects described herein.

FIG. 5 illustrates a portion of the propeller assembly 10 including the spider hub assembly 12 and illustrating only a portion of a single propeller blade 20 therein. While a plurality of circumferentially spaced propeller blades 20 can be supported within the spider hub assembly 12 as illustrated in FIG. 2, only a portion of one propeller blade 20 is illustrated in the remaining figures for brevity and clarity purposes. As can more easily be seen the blade root 22 is mounted via the clamp 26 to a radially outboard portion of the arm 16. The blade root 22 can include, but is not limited to, an outer sleeve 23, as illustrated, or an integral part of the propeller blade 20.

The torque tube 44 has a first end 60 and an opposing second end 62. A portion of the torque tube 44 extends the length of the arm 16, the first end 60 projects radially outboard, and the second end 62 projects radially inward extending into the recess 34 of the hub 14. The first end 60 is configured to operably couple to the blade root 22 such that the blade root 22 rotates along with the torque tube 44. This can be accomplished in any suitable manner including, but not limited to, that the first end 60 of the torque tube 44 is fixedly mounted to the blade root 22. In the illustrated example, the first end 60 of the torque tube 44 is keyed to the blade root 22 with a set of pins 64.

Also more clearly shown in FIG. 5 is that the crosshead 42 is located within the recess 34 and is axially moveable relative to the hub 14. The motion converter 46 operably couples the crosshead 42 to the torque tube 44 and is configured to convert axial movement of the crosshead 42 into rotational movement of the torque tube 44. In the illustrated example, and by way of non-limiting example, a link 70 and a needle bearing 72 are included in the motion converter 46. The link 70 is fixedly mounted to the second end 62 and the torque tube 44. The needle bearing 72 pivotally couples the link 70 to the crosshead 42.

A crosshead flange 74 can also be included in the motion converter 46 to couple the needle bearing 72 to the crosshead 42. The crosshead flange 74 is illustrated as including a pair of spaced rails 80 provided on the crosshead 42 to define a channel 82 between the spaced rails 80. The crosshead flange 74 can be an integral portion of the crosshead 42 or the crosshead flange 74 can be a separate piece mounted to the crosshead 42. The needle bearing 72 includes a bearing 84 located within the channel 82. The bearing 84 can be rotatably mounted to the link 70.

Further, a bushing 90 is illustrated as being included within the spider hub assembly 12. More specifically, the bushing 90 is illustrated as being located in the arm 16. The bushing 90 supports the second end 62 of the torque tube 44 and is configured to mitigate or eliminate fretting between the spider hub assembly 12 and the torque tube 44. The bushing 90 can be formed from any suitable material including, but not limited to, brass.

During operation, an engine provides rotational motion to the spider hub assembly 12 and the propeller blades 20 convert rotary motion into a propulsive force. The pitch control assembly 40 can be used to vary the blade pitch of the propeller blades 20 by rotating the propeller blade 20 to turn the angle of attack of the propeller blade 20 as indicated by arrows 92. More specifically, the oil pressure to the hydraulic cylinder 50 can be varied such that the piston 52 is moved axially as indicated by the arrow 94 in FIG. 6. The axial movement of the piston 52 in turn causes axial movement of the crosshead 42, which is mounted thereto. The motion converter 46 converts the axial movement of the crosshead 42 into rotational movement of the torque tube 44. Converting the axial movement into rotational movement includes pivoting the link 70, which is rotatably connected to the crosshead 42 and another end fixedly mounted to the torque tube 44. More specifically, in the illustrated example, the crosshead 42 is moved axially and the bearing 84 is retained by the channel 82. Because the link 70 is fixedly mounted to the second end 62 of the torque tube 44 the link 70 pivots about the torque tube 44 such that as the bearing 84 is moved axially the link 70 rotatably moves with respect to the bearing 84, which is retained in the crosshead 42. This in turn causes rotational motion of the torque tube 44 and the blade root 22.

Figure 6:
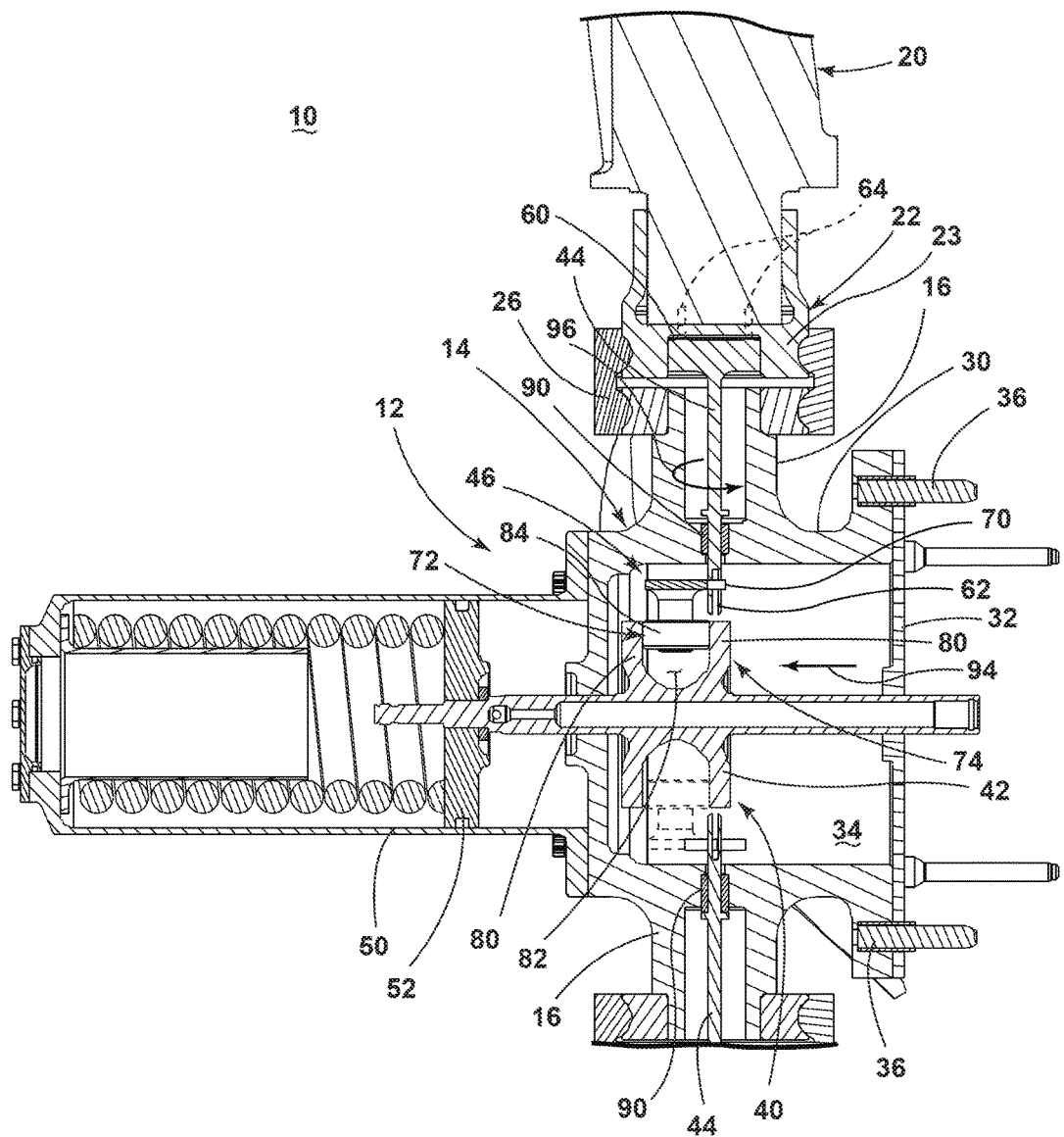
FIG. 6 illustrates an example cross-sectional view of the portion of the propeller assembly in accordance with various aspects described herein.

In this manner, embodiments can include a method of adjusting the pitch of a propeller blade 20 in a spider hub assembly 12 through axially moving a crosshead 42 within the hub 14 to generate a torque and transferring the torque to the propeller blade 20 using a torque tube 44. The transfer of the torque to the propeller blade 20 with the torque tube 44 is done without gears. Thus, a pitch angle of the propeller blade 20 can be adjusted by axially moving the crosshead 42 to rotate the torque tube 44 to effect a corresponding rotation of the propeller blade 20. FIG. 6 illustrates the propeller blade 20 with a pitch change as compared to FIG. 5. It will be understood that the set of propeller blades 20 can each be operably coupled to the crosshead 42 via a motion converter 46 and torque tube 44 to provide for simultaneous rotation of the propeller blades 20 in response to axial movement of the piston 52.

The embodiments described above may provide for a variety of benefits including a propeller assembly with a spider hub and a pitch change assembly, which has reduced complexity, low cost, and low weight. The above-described embodiments may provide a better design solution as compared to traditional pitch change mechanism for spider hub propeller system. Further, the above-described embodiments provide for easy assembly and repair. Further, the above described embodiments allow the propeller blade to be line replaceable.

This written description uses examples to disclose the embodiments, including the best mode, and also to enable any person skilled in the art to practice the innovation, including making and using any devices or systems and performing any incorporated methods. The patentable scope of the innovation is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A propeller assembly, comprising:
   a spider hub comprising a hub defining an interior and a set of arms spaced circumferentially about the hub and projecting radially from the hub, wherein the set of arms are configured to receive a set of blades such that a blade root of a blade of the set of blades is rotationally mounted to an outer periphery of an arm included in the set of arms;
   a crosshead located within the interior of the hub and axially moveable relative to the hub;
   a torque tube located in the arm and extending into the hub, and having opposing first and second ends, with the first end configured to mount to a proximal most portion of the blade of the set of blades, the torque tube spanning a length, between the first end and second end, from the outer periphery of the arm to the interior of the hub; and
   a motion converter located within the interior of the hub and coupling the crosshead to the second end of the torque tube, the motion converter configured for converting axial movement of the crosshead into rotational movement of the torque tube and a pitch angle of the blade can be adjusted by axially moving the crosshead to rotate the torque tube to effect a corresponding rotation of the blade.

2. The propeller assembly of claim 1 wherein the motion converter includes a link fixedly mounted to the torque tube and a needle bearing pivotally coupling the link to the crosshead.

3. The propeller assembly of claim 2 wherein the crosshead includes a crosshead flange that includes a pair of spaced rails provided on the crosshead to define a channel between the pair of spaced rails, and the needle bearing includes a bearing retained within the channel.

4. The propeller assembly of claim 3 wherein the bearing is rotatably mounted to the link.

5. The propeller assembly of claim 3 wherein the first end of the torque tube is fixedly mounted to the blade root.

6. The propeller assembly of claim 5 wherein the first end of the torque tube is keyed to the blade root.

7. The propeller assembly of claim 5, further comprising a bushing located within the arm and configured for supporting the second end of the torque tube.

8. The propeller assembly of claim 2 wherein the motion converter is configured to pivot at a first end, which is rotatably connected to the crosshead, and fixedly mounted to the torque tube at a second end.

9. The propeller assembly of claim 1 wherein the blade root does not extend into the hub.

10. A pitch control assembly for a propeller comprising a spider hub having a hub with a set of arms, and a set of blades rotatably mounted to the set of arms, comprising:
    a crosshead configured for axial movement relative to the hub, the crosshead spaced from the set of blades and having a crosshead flange that includes a pair of spaced rails provided on the crosshead to define a channel between the pair of spaced rails;
    a torque tube having a first end opposing a second end, with the first end configured to fixedly mount to a blade included in the set of blades and the second end extending into the hub; and
    a motion converter including a link fixedly mounted to the torque tube and a needle bearing pivotally coupling the link to the crosshead, wherein the needle bearing includes a bearing retained within the channel, the motion converter adapted to convert the axial movement of the crosshead into rotational movement of the torque tube;
    wherein a pitch angle of the blade is adjusted by axially moving the crosshead to rotate the torque tube to effect a corresponding rotation of the blade included in the set of blades.

11. The pitch control assembly of claim 10 wherein the bearing is rotatably mounted to the link.

12. The pitch control assembly of claim 11 wherein the link is fixedly mounted to the second end of the torque tube.

13. The pitch control assembly of claim 10 wherein the torque tube extends outside of the hub.

* * * * *